(12) United States Patent
Delong

(10) Patent No.: US 6,243,489 B1
(45) Date of Patent: Jun. 5, 2001

(54) METHOD FOR A NEURAL NETWORK FOR REPRESENTING IMAGING FUNCTIONS

(75) Inventor: Wolf-Ruediger Delong, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/079,132

(22) Filed: May 14, 1998

(30) Foreign Application Priority Data

May 15, 1997 (DE) ............................................. 197 20 468

(51) Int. Cl.⁷ ........................................................ G06K 9/62
(52) U.S. Cl. ............................. 382/157; 382/128; 706/25
(58) Field of Search ..................................... 382/100, 128, 382/130, 131, 132, 155, 156, 157, 158–160, 312, 318; 706/15, 16, 25, 26, 45, 924

(56) References Cited

U.S. PATENT DOCUMENTS

| 4,933,872 | * | 6/1990 | Vandenberg et al. ................... 706/22 |
| 4,950,894 | * | 8/1990 | Hara et al. ............................ 250/587 |
| 5,222,195 | * | 6/1993 | Alkon et al. ............................ 706/25 |
| 5,293,454 |   | 3/1994 | Kamiya .................................... 706/25 |
| 5,317,651 | * | 5/1994 | Refregier et al. .................... 382/210 |
| 5,359,699 |   | 10/1994 | Tong et al. ............................. 706/20 |
| 5,502,775 | * | 3/1996 | Takeo .................................... 382/169 |

FOREIGN PATENT DOCUMENTS 41 24 501    9/1994    (DE) .

* cited by examiner

*Primary Examiner*—Jay Patel
(74) *Attorney, Agent, or Firm*—Schiff Hardin & Waite

(57) ABSTRACT

In a method for a self-organizing neural network for representing multidimensional, nonlinear imaging functions onto simpler imaging functions use divider-membranes are employed for achieving an error free representation of the imaging function via the learning sample, allowing for a high level of generalization. Kohonen cell borders coincide with a required imaging function. The neural network can independently determine a number of neurons necessary for an error-free solution of a problem. A readout of the neural network can occur through the calculation of the minimum of the squares of the distances.

12 Claims, 3 Drawing Sheets

METHOD FOR A NEURAL NETWORK FOR REPRESENTING IMAGING FUNCTIONS

BACKGROUND OF THE INVENTION

The invention relates to a method for a self-organizing, error-free neural network for depicting multidimensional non-linear imaging functions.

Neural networks serve for imaging multi-dimensional feature vectors in simpler concepts or simpler contexts. A characteristic feature of a neural network is a two-stage procedure:

In a first phase, the learning phase, the feature space is divided into regions.

In a second phase, the readout phase, an allocation to the required concept or context is determined through appropriate linkage of these regions.

The two best know neural networks are the multi layer perception (MLP) and the two-dimensional Kohonen neural network (KNN). In MLP, the learning—that is the separation of the feature space—occurs by non-linear functions (mostly Gaussian or step functions). In KNN, the division of the feature space is achieved through centers of gravity (cluster centers). In the readout phase in MLP, the position of a required feature is defined through additive overriding of the corresponding non-linear functions; in KNN, as a rule, the nearest cluster center is simply output.

The terms "supervised" and "unsupervised" learning, likewise frequently used, play no roll therein. MLP is commonly equated with "supervised learning," since the target result of the learning process is used in the determination of the non-linear functions in the feature space, while in KNN, the allocation of the centers of gravity of the cluster to the target result is frequently not done until after the completion of the learning phase, so the learning itself occurs "unsupervised". On the other hand, the division "supervised/unsupervised" has little relevance in KNN, since the target result can be viewed as simply another dimension of the feature space. The structuring of the feature space then occurs in consideration of the target result. The achievement of an imaging function is in any case a "supervised" process, since the trainer of the neural network has the achievement of a desired purpose in mind. The term "self-organizing" is likewise confusing. KNN is frequently characterized as self-organizing. But the self-organization there relates merely to the independent expansion in the feature space, wherein the number of neurons is strictly prescribed.

The following intends to examine how errors originate in neural networks, and how these errors can be reduced, and even completely avoided, through knowledge about their origination. As a rule, neural networks are already burdened with errors in their learning data record. This means that the structural formation of the feature space in the learning phase occurs so unfavorably that the learning data record itself is also imaged incorrectly. The demand for freedom from error can of course only refer to the learning data record itself, as the "real" structure of the feature space is by definition unknown. If it were known, this definition could be utilized directly for the imaging. A useful quality of the neural network is, as a rule, defined in that following the completion of the learning phase, a feature vector until then unknown (a feature vector not contained in the learning random sample) is correctly allocated. The term "generalization" of a neural network is used for this as a rule, this concept characterizing the discovery of the simpler rules underlying the neural network.

The description or the structuring of the feature space is more easily understood in KNN. KNN should thus serve as the basis for this examination. With KNN, it is also easier to define a dimension for a generalization of the neural network or to analogously derive this from the basic ideas of KNN.

The functioning of KNN can be explained using a two-dimensional basic test. The transition to an arbitrarily high number of dimensions of the feature space is defined solely by two functions:

1) According to Euclid, the distance between two points in n-dimensional space is the root of the sum of the squares of the distances in the respective individual dimensions.

2) The function MIN determines that pair of points of a set of n-dimensional points which have the smallest distance to each other in the dimension Figures of the n-dimensional coordinates system.

There was a "feature space" given by the set of all the numbers in the two dimensions x and y. In a computer simulation, this space is further limited to the numbers between 0 and 1, wherein this limitation has no significance for the conclusions to be reached. A "concept space" is further given which is described, in that a connected region $B_i$ in the feature space is allocated to a concept. In a computer simulation, three regions are therein introduced which are depicted in FIG. 1:

$B_1$: the region within a circle 1 with radius $r_1$ about the center x1, y1

$B_2$: the region within a circle 2 with radius $r_2$ about the center x2, y2

$B_3$: the remainder 3 of the region outside $B_1$ and $B_2$.

That the regions $B_1$ and $B_2$ concern circles is of course unknown to the neural network to be trained. These circle characteristics are merely utilized in the computer simulation to create the feature vectors. The object of the neural network will be to find these regions in the learning phase using a finite number of examples, and to correctly allocate—later, in the readout phase—new feature combinations which were unavailable in the learning phase.

Using this example, a demand for the solvability of a problem with the aid of a neural network can already be established. In contrast, in a reverse conclusion, a neural network can reject a problem as unsolvable in some cases. For example, should the regions $B_1$ and $B_2$ overlap, then feature vectors would exist which allocate not only the concept $B_1$, but also the concept $B_2$ to a coordinate x, y. Such a problem is only achievable if the dimension of the feature vector is raised by at least one, i.e., if additional information is consulted for the solution of the problem.

Should the regions $B_1$ and $B_2$ mutually interlace in a very complicated fashion without overlapping, then the demand is placed on the universal set of the learning data that— analogously to the scanning theory of communications technology—they describe the regions $B_1$ and $B_2$ in a sufficiently precise manner. The demand on the neural network to be realized therein is that, given an arbitrarily complicated form of the region $B_1$, the neural network proposes a model which images at least the learning data record in an error-free fashion. For this error-free imaging, there exists a trivial solution in KNN; it is formed simply of the set of all learning data. However, the utilization of all the learning data would correspond exactly to the generalization zero. The neural network would have "understood exactly nothing". Thus, generalization must be related to how many feature vectors can be discarded without compromising the reliability of a statement. One can now show that KNN as previously expressed works error-free only in the trivial solution and in a few special cases.

There is a real learning data record of L elements (vectors), wherein each element is represented by two coordinates $x_i$ and $y_i$, as well as the information which concept $B_i$ is dealt with in the respective coordinate. $x_i$ and $y_i$ are equally distributed random numbers. The training begins with the choice of the necessary number K of what are known as Kohonen cells. In this regard, there is a lot of literature with suggestions for the choice. FIG. 2 shows the learning result for L=2000, B=3, and K=16. The choice K=16 is itself meaningless for the basic result. The precise learning coefficients are likewise meaningless, since what is interesting therein is the principle of error, and not the absolute quantity of error.

FIG. 2 depicts sixteen regions—what are known as cells 4—which arise through the choice of K. The cells 4 are represented by the respective cell core 5, which possesses precisely the coordinate $x_j$, $y_j$ learned through appropriate mean value formations in KNN. Because of the readout specification "minimal distance", all future coordinates are allocated to the respective surfaces of the Kohonen cells. Using the circles $B_1$ one can clearly see that as a rule, errors are unavoidable therein. The quality of the KNN is essentially dependent on the number of Kohonen cells; the more of the cells which are utilized, the smaller the cell regions are and thus the better the image accuracy is. Freedom from error can only be guaranteed in the current learning algorithm if all learning data are utilized. That is even completely independent of the amount.

SUMMARY OF THE INVENTION

It is an object of the invention to provide a method of representing a neuronal network of the abovementioned type, this method establishing an imaging in a rapid and error free fashion with simple rules and with the omission of unnecessary Kohonen cells.

According to the present invention, a method is provided for creating and analyzing an image. A device for creating an image is provided. A digital imaging system is also provided containing a neural network computer having a neural network therein, and also including a calculating unit for use in a learning phase for the neural network. An image display device receives an analyzed image output. By use of the digital imaging system in a learning phase, a multi-dimensional non-linear imaging function of the image is represented in a simpler imaging function by use of at least one divider-membrane for obtaining an error-free representation of the non-linear imaging function by use of a learning sample employed with the neural network, thus allowing for a high grade of generalization. Using the simpler imaging function, an analysis of the image is output to the image display device. One thereby obtains a neural network distinguished by its great freedom from error at a high degree of generalization. Furthermore, this method of the invention permits the direct specification of an expected reliability of the resulting neural network. The choice of the number of neurons for the solution of a certain problem can also be forgone, as the neural network independently determines the number of neurons necessary for an error-free solution of the problem. The simple readout of the neural network is not compromised by the calculation of the minimum of the squares of the distances.

The invention is further detailed using the exemplifying embodiment depicted in the drawings.

DESCRIPTION OF THE PREFERRED EMBODIMENTS

Figure 1:
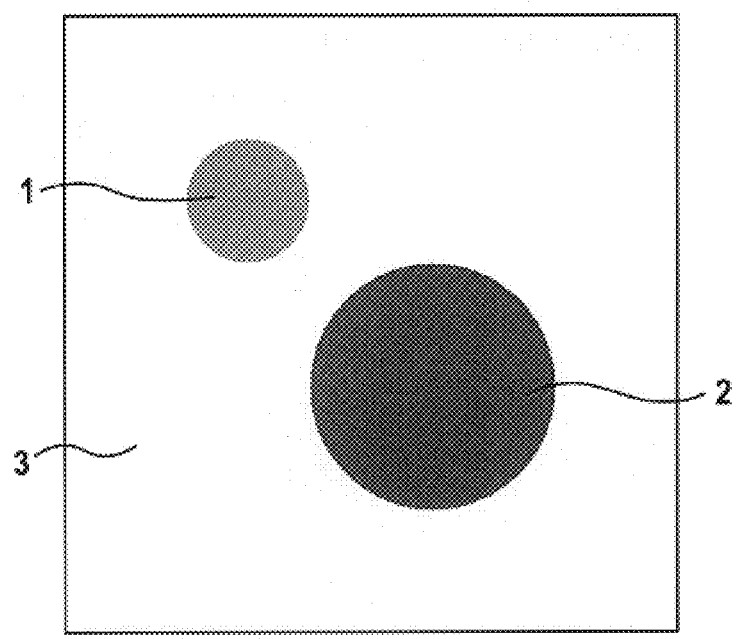
FIG. 1 is an example of a computer simulation with three regions, two of which correspond to a circular function.
Figure 2:
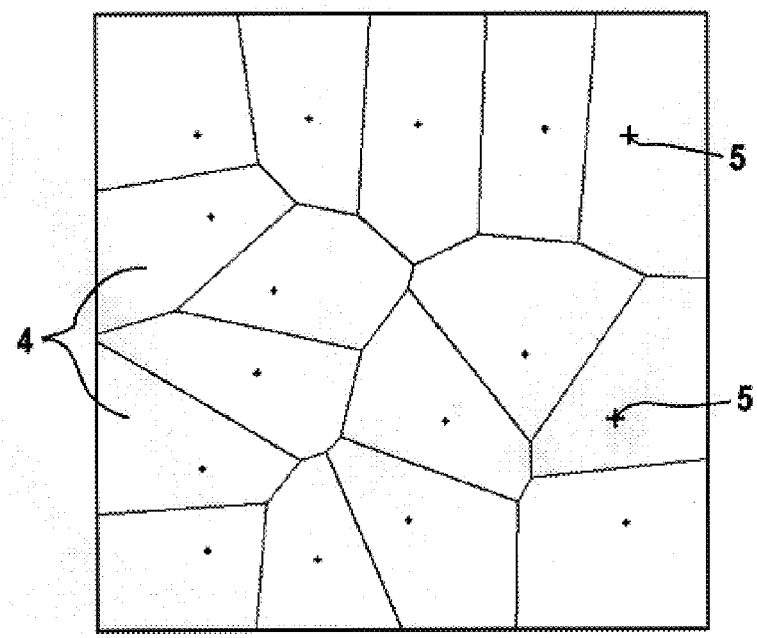
FIG. 2 shows the learning result, given application of KNN with 16 Kohonen cells and given a learning data record of 200 elements.
Figure 3:
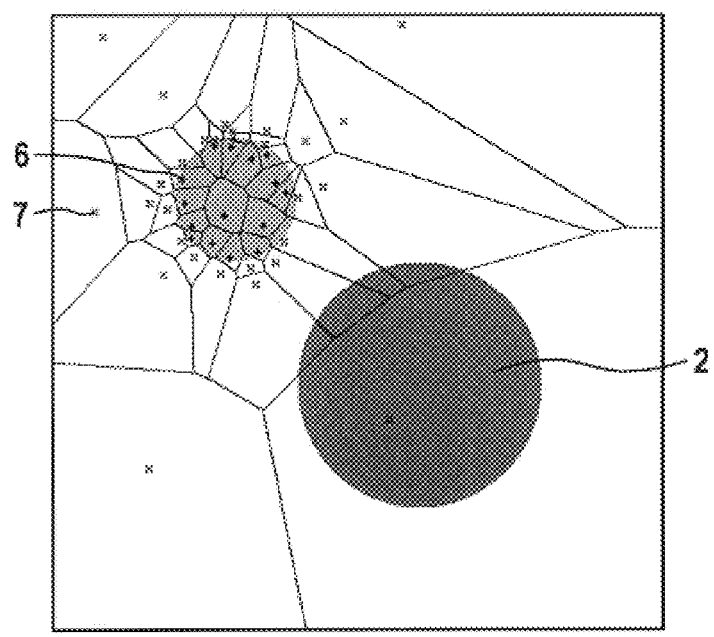
FIGS. 3 to 5 are illustrations for explaining the method of the invention for error-free representation of the Kohonen cell borders with generalization.
Figure 4:
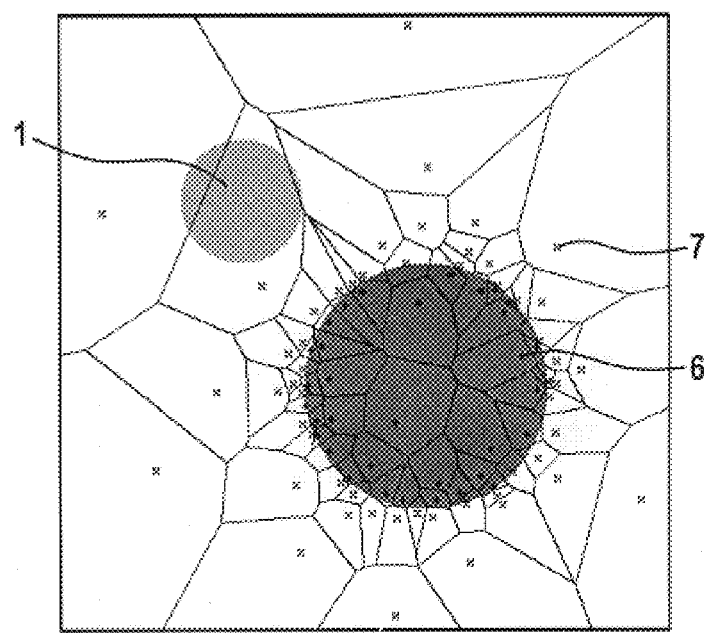
Figure 5:
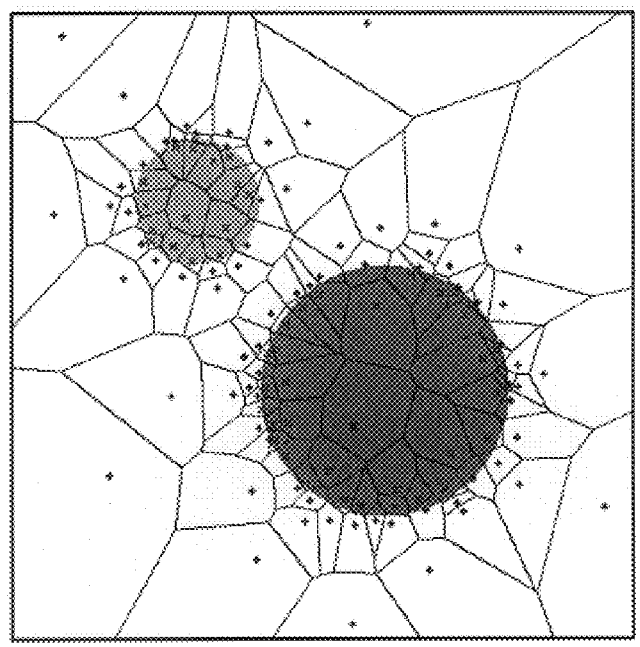

In what follows, using the FIGS. 3 to 5, a simple algorithm is described which coincides with the required imaging function. It is noted once again in this respect, that the circular function of the regions $B_1$ and $B_2$—which function was selected as the example and which forms the basis of the simulated data—cannot be found. The circles should merely be approximated such that the learning data record is represented free of errors, and the majority of the original learning data can be omitted, resulting in a good generalization.

In a first step, the number of the required regions $B_i$ is defined. If this is a matter of an analog, i.e. a continuous quantity, this quantity should be quantized, wherein the quantization error is not considered in the error determination.

In a second step, for every region $B_i$, the universal set of all learning data is split into two respective sets, a set inside the required region, and a second set outside this region, wherein each element is explicitly characterized with a "+"—as internal element 6— or with an "x"—as external element 7. The circle 1 is first treated in FIG. 3, and the processing for circle 2 is depicted in FIG. 4.

As the third step, the minimal distance to the set of all internal elements 6 is determined for each external element 7. If the shortest distance is actually to an internal element 6 and not to an external element 7 which was added to the internal set, then this external element 7 is added to the set of all internal elements 6 as a virtual internal element; i.e., the neighboring element with the shortest distance is a real internal element 6. If this shortest distance is to an external element 7 added to the internal set—to a virtual internal element—then this element is ignored.

The fourth step proceeds analogously to step 3—with the internal elements 6. The minimal distance to the set of all external elements 7 is determined for each internal element 6. If the shortest distance is actually to an external element 7 and not to an internal element which was added to the external set—to a virtual external element—then this internal element 6 is added to the set of all external elements 7; i.e., the neighboring element with the shortest distance is a real external element 7. If this shortest distance is to a virtual internal element 6 added to the external set, then this element is ignored.

In the subsequent step 5, all original real internal elements 6 are removed from the set of internal elements, but the virtual external elements are not.

Analogously to step 5, in step 6 all original real external elements 7 are removed from the set of external elements 7, but the virtual internal elements are not.

In step 7, the designations are inverted inside and outside and the two sets—the internal and external sets—are unified, as depicted in FIG. 5.

FIGS. 3 to 5 thus depict the result for the 3 sets $B_1$ to $B_3$ of the example above. It is clear that Kohonen cells bevel at the edge of the required region in the fashion of membranes. In its "self-organization", this gathering of cells goes beyond the behavior of the conventional KNN, since the number and the form of the cells are suited to the desired purpose. The membranes respectively are formed of an inside layer and an outside layer of Kohonen cells. But the borders of the Kohonen cells lie such that no error arises in the learning data record except for the potentially necessary quantization error in step 1 of the algorithm, and the generalization is formed of new, unlearned coordinates being imaged in an error-free fashion sufficiently from the borders of the required regions. The imaging itself becomes more exact, the more learning data is available in the border regions. In the present case of 2000 learning data records, region $B_1$ is defined by 34 cells, region $B_2$ by 16, and region $B_3$ by 76 Kohonen cells. In the original learning data, region $B_1$ is described by 267 vectors, region $B_2$ by 74 vectors and region $B_3$ by 1659 vectors. This can be viewed as a dimension for the generalization of the neural network, since it completely fulfills the imaging specification with some 6% of the learning data—as far as the instructions of the learning data records permit, in any case.

For an improvement in the known methods, the method of the invention makes use of a few properties.

1.) The cell borders of the Kohonen cells are established by the position of the neighboring cells. In the two-dimensional case, the border is respectively the perpendicular at the middle of the connection vector from the cell core to the next neighboring cell cores. The midpoint of the respective vector is thus the border point, and the vector direction gives information about inside and outside the cell. In multi-dimensional to high-dimensional feature spaces, nothing changes in this basic behavior. A section of a cell border is defined by a point on a high-dimensional surface in the corresponding high-dimensional space and a normal vector engaging at this point.

2.) For the generalization, assumptions are made about the learning data serving as a basis. It was in fact permitted, as was further described above, for the required regions to be mutually interlaced in an arbitrarily complicated fashion, while corresponding to the scanning theory of communications technology—the learning data represent the interlacing unambiguously.

3.) Via the MIN function, KNN represents a very elegant and economical method of representing the internal space of a region. If one would also find a way to coincide the Kohonen cell borders with the borders of the required regions, this would be an error-free representation of the learning data record with simultaneous maximizing of the generalization of the learning data record, since all Kohonen cells can be omitted which are not addressed via the MIN function.

It is again noted that the very simple algorithm above does not determine the absolute minimum of necessary Kohonen cells. A more complex algorithm is necessary for the absolute minimum. But this minimum has nothing to do with the functionality of the neuronal network itself; rather, the readout out time is merely increased thereby, so that a few distance calculations of the main function would in principle not be necessary. On the other hand, this property of the non-minimal number of cells can be exploited if new properties are to be post-trained at the readout time. A certain cell density is therein necessary, as described in example 4.

It is further noted that, despite their freedom from error, the cell membranes look very "jagged" in the learning data record. "Smoothing techniques" are applied here and the cell set is thereby possibly further reduced. On the other hand, it must be clear that the learning data record itself delivers no indication of any kind in this regard. But if additional information exist, however, it would be necessary to consider whether it would not be more sensible to accommodate them in the features themselves.

The learning function above now has a whole series of further advantages which go beyond the possibilities of the known neural networks MLP and KNN, since the imaging function of the neural network is completely linear and the only utilized nonlinearity is introduced through the MIN function. A few examples in this regard:

1) A statement about the complexity of the problem and about the generalization can be made through the ratio of surface to volume of a region to be imaged. In the example depicted in FIG. 5, the "surface" is represented by 76 neurons, and the "interior space" by 1659 neurons. This corresponds to a generalization of about $1-76/1659=0.95$ if 1.0 is defined as a non-achievable limit value of the generalization.

2) A statement can be made about the reliability of the feature space through the Hamming distance—the minimal distance between two regions to be imaged. If this distance is very small, then perhaps it is advisable to utilize other features or dimensions.

3) It can be determined through the Hamming distance which features or dimensions still sufficiently divide the region to be imaged.

4) Problems are frequently present in which the interval between regions is of no interest, as the region $B_3$ in the abovementioned example, for example. If this region is carried in the complete network, the network can react to entirely new events such as the sudden appearance of a region $B_4$ never before present, since it stores the coordinate under a rubric $B_4$ which is newly constructed. The draw-in area for this region is then, of course, relatively large, since the density of the cluster centers in this area is very low. In principle, entirely new properties are thus learnable at the running time in a very simple manner.

5) If the interval between the regions is of no interest, its cell coordinates can be simply omitted. If vectors then appear in this region later in the readout phase, they are automatically allocated to the nearest region. This property can be useful with noisy data, for example.

Such methods can be used in x-ray technology, particularly angiography, for example.

Figure 6:
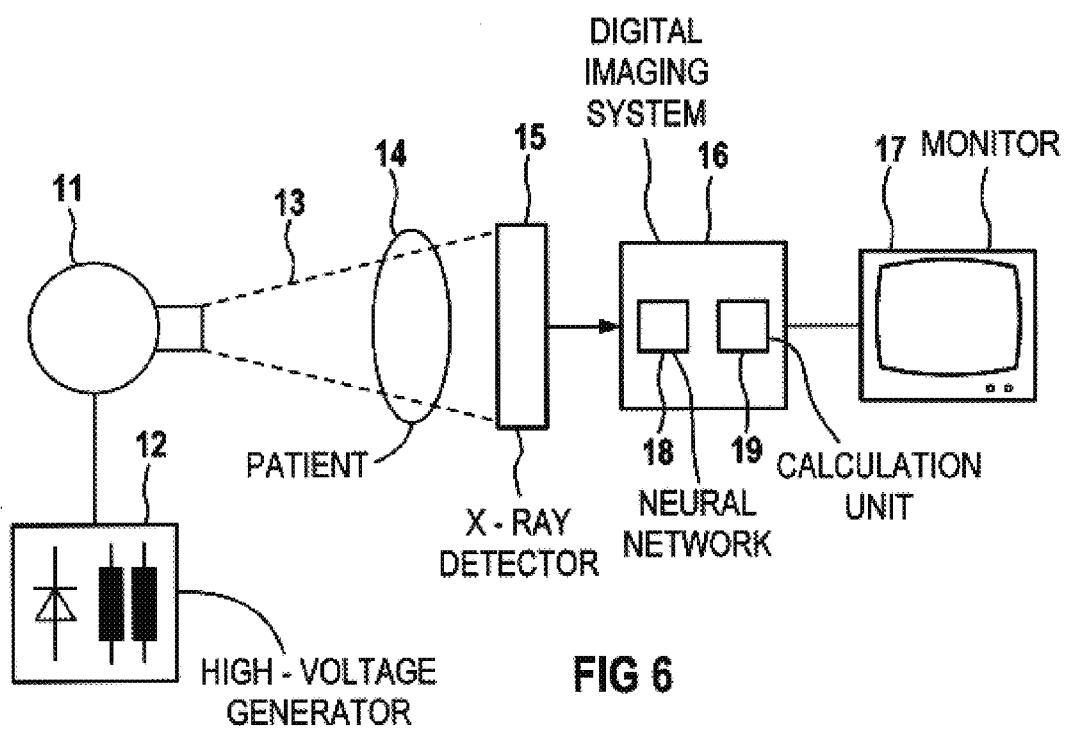
FIG. 6 is an x-ray diagnostic unit with an imaging system with a neural network of the invention.

For performing the method of the invention, as illustrated in FIG. 6, a device is provided for creating an image. This can, for example, be an x-ray diagnostic unit with an x-ray tube 11 which is operated by a high-voltage generator 12. The x-ray tube 11 emits an x-ray bundle 13 which passes through a patient 14 and falls on an x-ray detector 15 in an attenuated state corresponding to the transparency of the patient 14.

A digital imaging system containing a neural network computer having a neural network therein is provided, and also including a calculating unit for use in a learning phase for the neural network. In the patient analysis example of FIG. 6, the x-ray detector 15 converts the x-ray image into electrical signals which are processed in a digital imaging system 16 connected thereto and are fed to a monitor 17 for reproducing the x-ray image. The digital imaging system 16 can comprise processing circuits, converters, differential stages and image storage units in known fashion.

In such an x-ray diagnostic unit, the x-ray detector 15 can be a solid state image converter of amorphous silicon (aSi:H) or an x-ray image intensifier with a coupled TV camera which can comprise a TV reception tube or a CCD image converter.

The digital imaging system 16 comprises a circuit arrangement for segmenting x-ray images, this arrangement comprising a self-organizing, error-free neural network 18 for representing multi-dimensional non-linear imaging functions. Particular features can be extracted from the x-ray image by means of the method of the invention. Particularly in angiography, the blood vessels filled with the contrast agent can thus be brought to the fore more clearly and their visibility and identifiability can be improved.

At the neural network 18, a calculation unit 19 can be connected which calculates the minimum of the squares of the distances in the readout of the neural network 18.

Such a neural network can also be utilized in an imaging system for an automatic contrast optimizing or windowing, for example.

Although various minor changes and modifications might be proposed by those skilled in the art, it will be understood that my wish is to include within the claims of the patent warranted hereon all such changes and modifications as reasonably come within my contribution to the art.

I claim as my invention:

1. A method for creating and analyzing an image, comprising:

providing a device for creating an image;

providing a digital imaging system containing a neural network computer having a neural network therein, and also including a calculating unit for use in a learning phase for the neural network;

providing an image display device for receiving an analyzed image output;

by use of the digital imaging system in a learning phase, representing a multi-dimensional non-linear imaging function of said image in a simpler imaging function by use of at least one divider-membrane for obtaining an error-free representation of said non-linear imaging function by use of a learning sample employed with said neural network thus allowing for a high grade of generalization; and using said simpler imaging function, outputting an analysis of the image to said image display device.

2. The method according to claim 1 wherein for the representation of the imaging functions, Kohonen cell borders coincide with a required imaging function.

3. The method according to claim 1 wherein the neural network independently determines a number of neurons necessary for an error-free solution of a problem.

4. The method according to claim 1 wherein a readout of the neural network occurs through the calculation of a minimum of the squares of distances.

5. The method according to claim 1 wherein for error-free representation of high-dimensional non-linear imaging functions whose results are allocated to certain regions, performing the further steps of:

determining a number of required regions;

splitting a universal set of all learning data for each region into two respective sets, wherein a first set with internal elements lies inside the required regions, and a second set with external elements lies outside the required region;

determining a minimal distance from each external element to a set of all internal elements, wherein said external element is added to the set of all internal elements as a virtual internal element if a shortest distance is actually to an internal element;

determining a minimal distance from each internal element to a set of all external elements, wherein said internal element is added to the set of all external elements as a virtual external element if a shortest distance is actually to an external element;

deleting all original real internal elements from the set of the internal elements;

deleting all original real external elements from the set of external elements;

inverting designations inside and outside; and unifying the two sets.

6. The method according to claim 5, including the step of quantizing analog, continuous quantities.

7. The method according to claim 5 including the step of explicitly designating each element as an internal element or an external element when splitting the universal set.

8. A system for creating and analyzing an image, comprising:

an image creation device which outputs an image;

a digital imaging system containing a neural network computer having a neural network therein, and also including a calculating unit for use in a learning phase for the neural network;

an image display device for receiving an analyzed image output;

the digital imaging system, in a learning phase, representing a multi-dimensional non-linear imaging function of said image in a simpler imaging function by use of at least one divider-membrane for obtaining an error-free representation of said non-linear imaging function by use of a learning sample employed with said neural network, thus allowing for a high grade of generalization; and the digital imaging system, by use of said simpler imaging function, outputting an analysis of the image to said image display device.

9. The system according to claim 8 wherein said digital imaging system segments medical images with a neural network.

10. The system according to claim 8, wherein the neural network is constructed such that it independently determines a number of neurons necessary for an error-free solution of a problem.

11. The system according to claim 8 wherein a circuit arrangement is connected to the neural network which calculates a minimum of squares of distances in a readout from the neural network.

12. The system according to claim 8 wherein said image creation device comprises an x-ray detector for analyzing a patient.

* * * * *